United States Patent Office 3,166,892
Patented Jan. 26, 1965

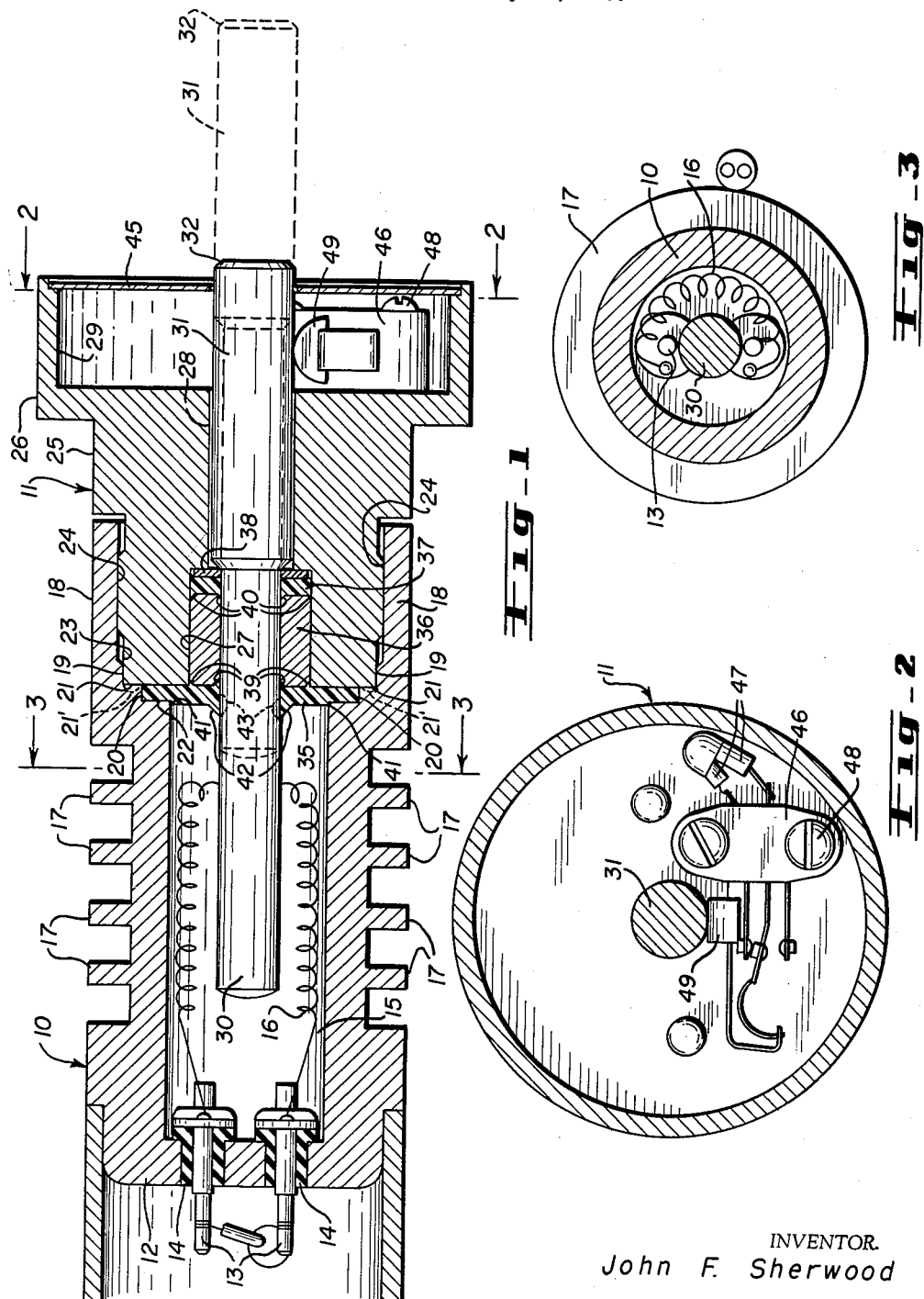

3,166,892
ACTUATOR AND SEAL WITH SHAFT-LUBRICAT-
ING MEANS THEREFOR
John F. Sherwood, 7801 W. 39th Ave.,
Wheat Ridge, Colo.
Filed July 15, 1963, Ser. No. 295,003
12 Claims. (Cl. 60—23)

This invention relates to actuators and seals therefor, and more particularly to a thermally controlled actuator which comprises a high pressure chamber containing expansible material for operating a reciprocable shaft mounted in the actuator for transmitting motion to mechanism located externally of the actuator housing. The expansible material may be wax or other suitable substance capable of expanding when heated and contracting when cooled.

The seal, herein described as part of a thermally controlled actuator which employs expansible material as the motive power, may be embodied in other types of actuators containing any power producing material which may adhere to the piston shaft and be carried out of the chamber in which such materials are designed to be retained.

The main object of the invention is to provide sealing means whereby the loss of wax or other material from the high pressure chamber is prevented or minimized to such a degree that the loss is not detrimental to the operation of the device. Such loss occurs due to the presence of a film of the expansible material on the piston shaft as it moves outwardly of the pressure chamber on its power stroke. Notwithstanding the use of wipers, scrapers and conventional seals of various kinds, it heretofore has been impossible to eliminate completely all leakage. When wax is employed as the material in the high pressure chamber, a wax film hardens on the shaft with resultant loss of material from the chamber and loss of power due to added friction between the shaft and its bearing. Loss of expansible material from the high pressure chamber is a serious detriment to the efficient operation of the thermal motor because the motor depends on the volumetric expansion of the material to produce the power stroke of the piston shaft. Any loss over a period of time will result in reduced expansion capacity due to the lessened quantity of expansible material in the chamber.

Therefore it is an object of this invention to provide a seal whereby both loss of expansible material and reduction of power is prevented.

Another object of the invention is to provide a seal which also serves to lubricate the piston shaft and to repel the adherence of solid type expansible material on the shaft. Shafts which operate in lubricant filled chambers, such as hydraulic systems, do not present the problem which results from hardening of solid type material on the shaft when cooled and the consequent creation of friction which hinders the operation of the shaft. The seal of my invention employs a shaft bearing preferably of porous bronze saturated with a lubricant, either liquid or solid type such as motor oil, paraffin oil, silicone and the like.

Another object of the invention is to obtain maximum lubrication of the shaft bearing so that the bearing will retain its lubricating capacity for the life of the thermal motor.

Another object of the invention is to construct the seal and actuator housing in such manner that assembly of the housing and the sealing means cooperates to impose lateral and circumferential pressure on the seal parts and to thereby enhance the sealing efficiency of the assembly.

In the drawings:

FIG. 1 is a longitudinal vertical sectional view of a thermal actuator embodying my invention.

FIG. 2 is a transverse sectional view in the plane of the line 2—2 of FIG. 1.

FIG. 3 is a transverse sectional view in the plane of the line 3—3 of FIG. 1.

In the embodiment of the invention shown in the drawings, a thermal actuator housing comprises two cylindrical metal members 10 and 11, connected together endwise to form a unitary structure. Making the housing in two parts facilitates assembly of the operative parts within the housing, and serves the additional function of providing pressure-exerting walls for confining the parts which comprise the seal for retaining motive-power producing material within the housing.

The housing member 10 has a closed end wall 12 in which are mounted electrodes 13 and electrode seals 14. The housing 10 is hollow and forms a high pressure chamber 15 which contains the electrical heating element 16 as well as the expansible and contractible material which fills the chamber. This material may be wax or other suitable substance having the desired thermally responsive expansion and contraction characteristics. Fins 17 on the exterior surface of the housing 10 aid in dissipating heat from the housing. The end portion 18 of the housing 10 extends beyond the chamber 15 and is internally larger in diameter than said chamber for the purpose of receiving and surrounding part of the housing member 11.

In the area where the housing portion 18 merges with the rest of the high pressure housing 10, said housing is offset on its internal surfaces to provide concentric shoulders 19 and 20 parallel to the axis of the housing. The surfaces 19 and 20 are connected by a radially extending surface 21. Adjacent the shoulder 20 is a radially extending surface 22 on the inner end of the housing 10. Shoulders 19 and 20 are concentric surfaces of different diameters for a purpose to be explained.

Housing member 11 has different radial thicknesses and diameters as indicated by the external surfaces 23, 24, 25 and 26, and the internal surfaces 27, 28 and 29. The latter define bores of different diameters. The inner end of the housing member 11 is a radial surface which fits snugly against the radial surface 21 of the housing member 10. Initially this end surface of the housing 11 is formed with a small annular projection 21' as indicated in dotted lines in FIG. 1. When the two housing members 10 and 11 are assembled and forced toward each other endwise under pressure, the projection 21' is crushed and pressed into the body on which it is formed so that the end surface of the housing 11 and the surface 21 of housing 10 are flat closely contacting surfaces as shown in full lines in the drawing.

The surface 23 of housing 11 closely contacts shoulder 19 of housing 10, and the surface 24 of housing 11 likewise has tight frictional contact with the inner surface of the portion 18 of housing 10.

A piston shaft 30 is located in the high pressure chamber 15 and extends into the bore defined by the surfaces 27 and 28 of the housing 11. The piston shaft has a work engaging portion 31 terminating in cap 32.

Before the housing members 10 and 11 are assembled in their intended relationship to each other, a sealing device comprising four parts, namely, a piston seal 35, shaft bearing 36, lubricant seal 37 and washer 38, is installed as shown in FIG. 1. The piston seal 35 is a wiper seal made of non-rigid material capable of withstanding high pressures. Both the piston seal 35 and lubricant seal 37 are made of such material, of which "Rulon" and "Teflon" are examples. The shaft bearing 36 is made of porous metal, such as bronze, saturated with silicone oil or other lubricant. Silicone oil is repellant to wax in that it prevents adherence of wax to the shaft and prevents formation of a dry hard coating of wax on the shaft. Silicone oil therefore is preferred for saturating the bearing when wax is used as the expansible material in the actuator. The lubricant seal 37 retains the lubricant in the saturated bearing 36 and together with the seal 35 prevents escape of material out of the high pressure chamber 15.

The proximate faces of the seals 35, 37, before installation, are flat. When forced toward each other against opposite ends of the bearing 36, by the pressure exerted by the proximate faces of the housing members 10, 11, when assembled, said faces of the seals 35, 37 are deformed as indicated at 39 and 40, respectively. Likewise, the contact between the surface 22 and seal 35, under pressure, forms the shoulder 41 on the seal 35 on that face toward the high pressure chamber 15. The washer 38 prevents the lubricant seal 37 from becoming deformed under pressure. The piston seal 35 preferably is thickened slightly on the side facing the pressure chamber 15, as indicated at 42, and initially is formed with an annular lip 43 shown in dotted lines, which makes the surface of the central hole in the seal 35 slightly cone shaped instead of truly cylindrical. After the shaft 30 has been inserted through the sealing means, this lip 43 is compressed into the body of the seal 35, and enhances the sealing function thereof.

A closure plate 45 is connected to the end of the housing member 11. A switch chamber formed inwardly of the closure plate houses a micro-switch 46, lead wires 47, switch screws 48 and switch shoe 49. The switch 46 is a limit switch for controlling the length of stroke of the shaft 31. When the shaft 31 has reached the maximum predetermined stroke desired, the shoe 49 is actuated to open the circuit and to cut off current to the electrodes 13. The connections between the leads 47 of the switch and the electrodes 13 are not shown. Since various forms of switches may be used in motors of this type, detailed description is unnecessary.

In operation of the described actuator, when current is applied the wax or other thermally responsive material expands and causes the shaft 30 to move outwardly, to the right in the drawing. The piston seal 35 serves as a wiping means for removing excessive material from the shaft and keeping the expansible material in the high pressure chamber 15. The film of material which otherwise would harden on the shaft when cooled is prevented from adhering to the shaft by the seal 35 and by the lubricant impregnated in the bearing 36. The lubricating seal 37 also has a wiping action on the shaft and keeps the lubricant in its bearing.

The method employed to saturate the bearing with lubricant is as follows: The bearing is placed in a container with the lubricant under vacuum until all air is removed from the bearing and the bearing is saturated to maximum capacity. A bearing made of bronze porous material, saturated with lubricant while both are under vacuum, provides maximum lubrication.

The advantages of the invention over prior art means are achieved by the described combination of sealing and lubricating means applied to a reciprocable shaft, installed in a housing constructed to exert pressure against opposite sides of the sealing means in axial direction, and to confine the sealing means peripherally in such way as to cause the sealing means to exert maximum wiping action on the shaft and at the same time retain the bearing and shaft lubricant within the sealing means. Further advantages are achieved by the impregnation of the bearing, under vacuum, with a selected lubricant which not only lubricates the shaft but repels adherence of wax on the shaft. The saturation of the bearing with lubricant is such that sufficient lubricant to last the anticipated life of the actuator is provided, and hardening of the wax on the shaft is prevented.

Although the invention is especially adapted for embodiment in a thermally controlled actuator, it is to be understood that the sealing and lubricating means may be a valuable part of any structure in which is mounted a reciprocable shaft and which houses power-producing material intended to be retained in the structure.

Changes may be made in the form and details of construction shown herein without departing from the scope of the invention defined by the appended claims.

I claim:

1. In an actuator comprising a housing, a pressure chamber in the housing, power producing material in the pressure chamber, and a piston shaft mounted in the housing for reciprocable movement therein, the improvement which comprises sealing and shaft-lubricating means comprising
   (a) a centrally apertured piston sealing disc extending transversely of the housing and located adjacent one end of the pressure chamber,
   (b) a centrally apertured transversely extending lubricant sealing disc spaced from the piston sealing disc,
   (c) a porous metal lubricant-saturated bearing located between and concentric with said discs,
   (d) said shaft extending through said bearing and the disc apertures in close contact with the discs,
   (e) means on the interior surfaces of the actuator housing exerting pressure against the sealing discs and thereby forcing said discs in axial directions against opposite ends of said bearing, and
   (f) concentric surfaces on the interior of the housing confining the peripheral surfaces of said sealing discs, whereby said piston sealing disc exerts wiping action on the shaft, said bearing lubricates the shaft, and said lubricant sealing disc prevents loss of power-producing material from the pressure chamber and loss of lubricant from the bearing.

2. The actuator sealing and shaft-lubricating means defined by claim 1, in which the sealing discs are made of non-rigid plastic material.

3. The actuator sealing and shaft-lubricating means defined by claim 1, in which the shaft bearing is saturated with lubricant while the bearing and lubricant are maintained under vacuum.

4. The actuator sealing and shaft-lubricating means defined by claim 1, in which the shaft bearing is saturated with silicone oil while under vacuum.

5. The actuator sealing and shaft-lubricating means defined by claim 1, in which the sealing discs have annular projections on their proximate faces produced by pressure against said sealing discs which force said discs in axial directions against opposite ends of the bearing and deform the disc surfaces, said projections overlapping the bearing ends and making a functionally unitary structure of the discs and bearing.

6. The actuator sealing and shaft-lubricating means defined by claim 1, in which the piston sealing disc is initially provided with an inwardly projecting lip on the surface of its central aperture adjacent the pressure chamber, said lip being forced into the body of the disc by the presence of the piston shaft in the disc aperture to thereby densify the disc and increase its wiping action on the shaft.

7. The actuator sealing and shaft lubricating means defined by claim 1, in which the power producing material in the pressure chamber is wax, and the lubricant in the bearing is silicone oil.

8. The actuator sealing and shaft lubricating means defined by claim 1, which includes a metal washer located adjacent the lubricant sealing disc on the side removed from the piston sealing disc.

9. In an actuator comprising first and second housing members, a pressure chamber in the first housing member, power producing material in the pressure chamber, and a piston shaft mounted in the housing for reciprocable movement therein, the improvement which comprises sealing and shaft-lubricating means comprising
   (a) a centrally apertured piston sealing disc extending transversely and located between the two housing members,
   (b) a centrally apertured lubricant sealing disc extending transversely in the second housing member, (c) a porous metal lubricant-saturated bearing located between and concentric with said sealing discs, (d) said shaft extending through said bearing and through the disc apertures in close contact with said discs, (e) the actuator housing members being connected together and having internal transverse radially extending surfaces which exert pressure against the sealing discs and thereby force said discs in axial directions against opposite ends of said bearing, and (f) concentric surfaces of different diameters on the interior of said housing members confining the peripheral surfaces of said sealing discs, whereby said piston sealing disc exerts wiping action on the shaft, said bearing lubricates the shaft, and said lubricant sealing disc prevents loss of power-producing material from the pressure chamber and loss of lubricant from the bearing.

10. The actuator sealing and shaft-lubricating means defined by claim 9, in which the shaft bearing is saturated with lubricant while the bearing and lubricant are maintained under vacuum.

11. The actuator sealing and shaft-lubricating means defined by claim 9, in which the sealing discs have annular projections on their proximate faces produced by pressure against said sealing discs which force said discs in axial directions against opposite ends of the bearing and deform the disc surfaces, said projections overlapping the bearing ends and making a functionally unitary structure of the discs and bearing.

12. The actuator sealing and shaft-lubricating means defined by claim 9, in which the piston sealing disc is initially provided with an inwardly projecting lip on the surface of its central aperture adjacent the pressure chamber, said lip being forced into the body of the disc by the presence of the piston shaft in the disc aperture to thereby densify the disc and increase its wiping action on the shaft.

References Cited in the file of this patent
UNITED STATES PATENTS

| | | |
|---|---|---|
| 2,745,687 | Stack | May 15, 1956 |
| 2,992,864 | De Carbon | July 18, 1961 |
| 3,029,595 | Sherwood | Apr. 17, 1962 |
| 3,039,780 | Nordell | June 19, 1962 |